(12) United States Patent
Yeom et al.

(10) Patent No.: US 11,003,728 B1
(45) Date of Patent: *May 11, 2021

(54) NATIVE APPLICATION SEARCH RESULTS

(71) Applicant: Google LLC, Mountain View, CA (US)

(72) Inventors: Jaehyun Yeom, Mountain View, CA (US); Dong Ha Lee, Palo Alto, CA (US)

(73) Assignee: Google LLC, Mountain View, CA (US)

(*) Notice: Subject to any disclaimer, the term of this patent is extended or adjusted under 35 U.S.C. 154(b) by 157 days.

This patent is subject to a terminal disclaimer.

(21) Appl. No.: 16/270,876

(22) Filed: Feb. 8, 2019

Related U.S. Application Data

(63) Continuation of application No. 14/747,878, filed on Jun. 23, 2015, now Pat. No. 10,210,263.

(60) Provisional application No. 62/016,616, filed on Jun. 24, 2014.

(51) Int. Cl.
  *G06F 16/9535* (2019.01)
  *G06F 16/955* (2019.01)

(52) U.S. Cl.
  CPC ........ *G06F 16/9535* (2019.01); *G06F 16/955* (2019.01)

(58) Field of Classification Search
  CPC .......................... G06F 16/9535; G06F 16/955
  USPC ....................................................... 707/708
  See application file for complete search history.

(56) References Cited

U.S. PATENT DOCUMENTS

| | | | |
|---|---|---|---|
| 7,617,225 B2 | 11/2009 | Arrouye | |
| 7,853,606 B1* | 12/2010 | Marmaros | G06F 16/95 707/769 |
| 8,086,957 B2 | 12/2011 | Bauchot | |
| 8,458,384 B2 | 6/2013 | Johnson | |
| 8,510,764 B1 | 8/2013 | Deselaers | |
| 8,515,979 B2 | 8/2013 | Mehta | |
| 8,554,345 B2 | 10/2013 | Fernandez | |
| 8,595,450 B2 | 11/2013 | Nguyen | |
| 8,631,097 B1* | 1/2014 | Seo | G06F 16/9577 709/219 |
| 8,656,265 B1* | 2/2014 | Paulin | G06F 16/957 715/205 |
| 9,608,870 B1* | 3/2017 | Hendriks | G06F 16/9558 |
| 9,720,672 B2* | 8/2017 | Lipton | G06F 9/445 |
| 9,817,646 B1* | 11/2017 | Chen | G06F 9/45529 |
| 2004/0030882 A1 | 2/2004 | Forman | |

(Continued)

*Primary Examiner* — Mark E Hershley
(74) *Attorney, Agent, or Firm* — Dority & Manning, P.A.

(57) ABSTRACT

Methods, systems, and apparatus, for receiving a native application search result that identifies a native application and a first URI that causes the native application to display a native application page that includes content responsive to the query; determining, at the user device, whether the user device has a native application installed that can process the first uniform resource identifier (URI) of the native application search result; in response to determining that the user device does not have a native application installed that can process the first URI, processing, at the user device, a second URI that can be processed by the first application, where the second URI, when processed, causes the first application to display a first application page that includes content responsive to the query; wherein the content included in the first application page and the content included in the native application page are synchronized content.

18 Claims, 4 Drawing Sheets

(56) References Cited

U.S. PATENT DOCUMENTS

| | | | |
|---|---|---|---|
| 2005/0240943 A1* | 10/2005 | Smith | G06F 9/465 719/328 |
| 2006/0047644 A1* | 3/2006 | Bocking | G06F 16/903 |
| 2007/0209080 A1 | 9/2007 | Ture | |
| 2009/0210631 A1* | 8/2009 | Bosworth | G06F 12/0875 711/141 |
| 2010/0228724 A1* | 9/2010 | Petri | G06F 16/248 707/722 |
| 2010/0257466 A1 | 10/2010 | Wroblewski | |
| 2010/0306191 A1 | 12/2010 | LeBeau | |
| 2011/0246567 A1* | 10/2011 | Cedervall | H04N 21/4431 709/203 |
| 2011/0252038 A1 | 10/2011 | Schmidt | |
| 2011/0314004 A1 | 12/2011 | Mehta | |
| 2012/0124061 A1 | 5/2012 | Macbeth et al. | |
| 2012/0179706 A1 | 7/2012 | Hobbs | |
| 2012/0179955 A1 | 7/2012 | French | |
| 2012/0221955 A1* | 8/2012 | Raleigh | H04L 12/1485 715/736 |
| 2012/0284247 A1* | 11/2012 | Jiang | G06F 16/9535 707/706 |
| 2012/0284256 A1* | 11/2012 | Mahajan | G06F 16/9537 707/722 |
| 2012/0290584 A1 | 11/2012 | De | |
| 2012/0316955 A1 | 12/2012 | Panguluri et al. | |
| 2012/0323898 A1* | 12/2012 | Kumar | G06F 16/957 707/723 |
| 2013/0006897 A1 | 1/2013 | Jain | |
| 2013/0019202 A1* | 1/2013 | Regan | G06F 16/9535 715/810 |
| 2013/0097596 A1* | 4/2013 | Queru | H04L 67/34 717/176 |
| 2013/0110815 A1 | 5/2013 | Tankovich | |
| 2013/0111328 A1 | 5/2013 | Khanna | |
| 2013/0122861 A1 | 5/2013 | Kim | |
| 2013/0124606 A1 | 5/2013 | Carpenter | |
| 2013/0139182 A1* | 5/2013 | Sethuraman | G06Q 50/01 719/320 |
| 2013/0191360 A1 | 7/2013 | Burkard | |
| 2013/0232256 A1 | 9/2013 | Lee | |
| 2013/0260739 A1* | 10/2013 | Saino | G06F 9/547 455/419 |
| 2013/0298007 A1 | 11/2013 | Cullen | |
| 2013/0325856 A1 | 12/2013 | Soto | |
| 2014/0047413 A1* | 2/2014 | Sheive | G06F 8/30 717/110 |
| 2014/0052617 A1* | 2/2014 | Chawla | G06Q 10/10 705/39 |
| 2014/0201179 A1* | 7/2014 | Chang | G06F 16/2272 707/706 |
| 2014/0244786 A1* | 8/2014 | Shapira | G06F 16/955 709/217 |
| 2014/0250147 A1* | 9/2014 | Shapira | G06F 16/9558 707/770 |
| 2014/0282032 A1* | 9/2014 | Brown | G06F 3/0484 715/738 |
| 2014/0316890 A1* | 10/2014 | Kagan | G06Q 30/0275 705/14.54 |
| 2014/0359598 A1* | 12/2014 | Oliver | G06F 8/61 717/174 |
| 2015/0254310 A1* | 9/2015 | Imaizumi | G06F 16/248 707/723 |
| 2016/0070801 A1* | 3/2016 | Patil | G06F 16/9535 707/727 |
| 2016/0085514 A1* | 3/2016 | Savliwala | G06F 3/0482 705/14.69 |
| 2016/0117388 A1* | 4/2016 | Fan | G06F 16/248 717/178 |
| 2016/0132596 A1* | 5/2016 | Harris | G06F 21/6245 707/722 |
| 2016/0179956 A1* | 6/2016 | Sogani | G06Q 30/0251 707/722 |
| 2016/0191639 A1* | 6/2016 | Dai | G06Q 30/0267 709/204 |
| 2016/0203519 A1* | 7/2016 | Ketchpaw | G06Q 30/0267 705/14.64 |

* cited by examiner

NATIVE APPLICATION SEARCH RESULTS

CLAIM OF PRIORITY

This application is a continuation (and claims the benefit of priority under 35 USC 120) of U.S. patent application Ser. No. 14/747,878, filed Jun. 23, 2015, which claims priority under 35 USC § 119(e) to U.S. Patent Application Ser. No. 62/016,616, filed on Jun. 24, 2014, the entire contents of which are hereby incorporated by reference.

BACKGROUND

The Internet provides access to a wide variety of information. For example, digital image files, video and/or audio files, as well as web page resources for particular subjects or particular news articles, are accessible over the Internet. With respect to web page resources, many of these resources are designed to facilitate the performing of particular functions, such as banking, booking hotel reservations, shopping, etc., or to provide information, such as on-line encyclopedias, movie databases, news, etc.

A variety of search engines are available for identifying particular resources accessible over the Internet. These search engines crawl and index the various web page resources. The search engine then uses the index to determine which resources are most responsive to a search query and provides search results that link to the resources in response to the query.

With the advent of tablet computers and smart phones, native applications that facilitate the performance of the same functions facilitated by the use of web page resources, or the provisioning of the same content by the use of web pages, are now being provided in large numbers.

SUMMARY

The present disclosure relates to native application deep linking, and more specifically to systems and methods for deep link processing when the target application is not present on a device seeking to access the linked content.

In general, one innovative aspect of the subject matter described in this specification can be embodied in methods that include the actions of receiving, at a user device in response to a query in a first application, a set of search results that identify resources responsive to the query, the search results including at least one native application search result that identifies a native application and a first uniform resource identifier (URI) that, when processed by the native application, causes the native application to display a native application page that includes content responsive to the query, wherein the native application is an application that is different from the first application; determining, at the user device, whether the user device has a native application installed that can process the first URI of the native application search result; in response to determining that the user device does not have a native application installed that can process the first URI, processing, at the user device, a second URI that can be processed by the first application, where the second URI, when processed, causes the first application to display a first application page that includes content responsive to the query; wherein the content included in the first application page and the content included in the native application page are synchronized content. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. When an application search result is served to a user device that does not have the corresponding native application installed, the uniform resource identifier (URI) can be rewritten with a URI of a corresponding web page. Thus, the search system need not necessarily store native application installation information for multiple user devices to distinguish when to provide native application search results. Instead, the embedded URI of a search result can be changed automatically, either in response to rendering or in response to a selection, thus providing the user with a seamless and smooth user experience.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
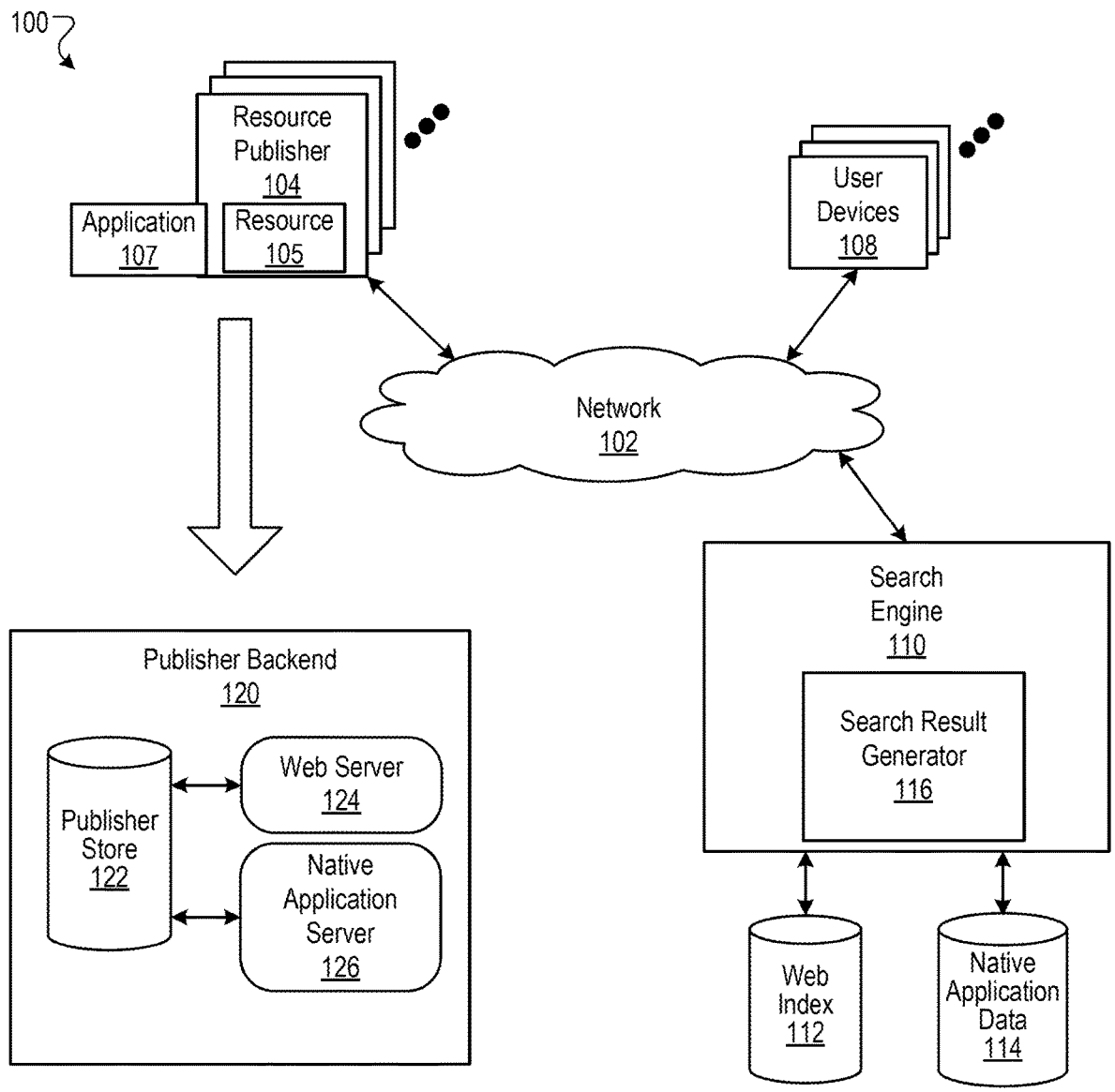
FIG. 1 is a block diagram of an example environment in which native application search results are provided with web resource search results in response to queries.

A system provides native application search results. As used herein, a native application operates independent of a browser application on the user device. A native application is an application specifically designed to run on a particular user device operating system and machine firmware and not within a browser. Native applications thus differ from browsers, browser-based applications and browser-rendered resources. The latter require all, or at least some, elements or instructions downloaded from a web server each time they are instantiated or rendered. Furthermore, browser-based applications and browser-rendered resources can be processed by all web-capable mobile devices within the browser and thus are not operating system specific as are native applications. Furthermore, as used herein, a native application search result is a search result that corresponds to a particular native application and that, when selected, invokes the particular native application.

Examples of native application include applications to create text documents, edit photographs, play music, interface with a remote banking system, and so on. Mobile native applications are designed to operate on mobile devices such as smart phones, tablets, and so on. Web native applications are designed to run within (both visually and functionally) web browser software. At a very high level, native applications, or simply "apps," provide a user with access to content and/or functionality.

Internet search engines provide the ability to search an indexed collection of web pages that exist on the Internet.

The typical search engine provides, in response to a query, a list of results relevant to the query, often with hyperlinks allowing a user to quickly navigate to a result of interest. A user may select a linked result and thereby be provided with a web page(s) containing content about a celebrity, product, business, etc. The links may be to a site's "home page" (e.g., a welcome and search page for a site aggregating cooking information such recipes) or may be a "content page" that a user can access when navigating from a site's home page (e.g., a specific recipe at the cooking information site). Links to content pages, as opposed to home pages, are referred to as "deep links" (and the process for crawling, indexing, and serving these content pages is similarly referred to as "deep linking").

The ability to navigate to a page, as well as the accessibility of content and functionality that that page provides, is dictated in part by the nature of the published page. For example, certain pages may contain dynamic content (e.g., asynchronous java script and XML (AJAX), Adobe Flash, etc.) that are difficult or impossible to crawl and retrieve. Consequently, these pages may not be available in response to a search, a user may not be able to save the page as a bookmark or the like, and page navigation via browser controls (e.g., forward and back in history) may not operate as intended.

In most instances, each home page (and many content pages) has a specific uniform resource locator (URL) permitting a quick navigation to that page. However, for many apps, content associated with the app or generated by the app does not have a specific URL, and/or can only be reached from within the app itself. In certain instances, a search for documents may be performed "within an app" or for content specific to that app. When properly configured to process a uniform resource identifier (URI), the browser may launch an app and instruct the app to present to a user a specific content page within the app. In such cases, the app content cannot be displayed by a general browser. That is, that app content cannot be deep linked such that the content is broadly and generally accessible (i.e., without having the app associated with the content on the device, and without accessing the content from within the app). In general, a web server typically only serves pages having web URLs, even if the app is present and the desired content has a link to the app (an "app link"). In some cases a browser can recognize that content requires a special app, but in such cases the user is most often presented with a chooser and required to select the appropriate app for accessing the content page via the page's URL.

According to the present disclosure, indexed pages are ranked based on a query. The results are presented. Upon render, or alternatively in response to a selection of, a native application search result that includes an app specific content page (URI), a client side script inspects the URI and determines whether the device on which the page is to be accessed is capable of processing the URI and accessing (e.g., displaying) the content page, for example by an application installed on the device. If the content page can be accessed, then processing proceeds to access. If the content page cannot be accessed, a check is made to determine if a URI rewrite can provide a link to an alternate target for the desired content. In some cases, an alternate source for the content of the target content page may be determined (e.g., a page capable of providing the content without invoking a specific app on the client device), and a URI may be "rewritten" (e.g., linked to a URL) to access the desired content from that alternate source. The target web URI may either be stored in the web page that was sent by the server (that is, the original link returns a page that specifies frames for some content that is app-specific), or it can be fetched on demand from the server. In the latter case, the client device requests from the server a web URL that serves the same content as that from the given URI. The server may maintain a table of these alternate sources for this purpose. The client device then rewrites the target link URI with the response from the server. The search result presented to the user remains unchanged from the user's perspective, the underlying link is rewritten, and target content page may then be accessed from the web as opposed to a specific app.

FIG. 1 is a block diagram of an example environment 100 in which native application search results are provided with web resource search results in response to queries. A computer network 102, such as the Internet, connects resource publisher web sites 104, application publishers 106, user devices 108 and a search engine 110.

A resource publisher website 104 includes one or more web resources 105 associated with a domain and hosted by one or more servers in one or more locations. Generally, a resource publisher website is a collection of web pages formatted in hypertext markup language (HTML) that can contain text, images, multimedia content, and programming elements. Each website 104 is maintained by a content publisher, which is an entity that controls, manages and/or owns the website 104.

A web page resource 105 is any data that can be provided by a publisher website 104 over the network 102 and that has a resource address, e.g., a uniform resource locator (URL). Web resources may be HTML pages, images files, video files, audio files, and feed sources, to name just a few. The resources may include embedded information, e.g., meta information and hyperlinks, and/or embedded instructions, e.g., client-side scripts.

A publisher 105 may also provide a native application 107. As described above, a native application 107 is an application specifically designed to run on a particular user device operating system and machine firmware. As used in this specification, an "application page" is a particular display environment within a native application and in which is displayed content, such as text, images, and the like. An application page is specific to the particular native application, and the native application is specific to the particular operating system of the user device 108. An application page differs from a rendered web resource in that the application page is generated within and specific to the native application, while a web resource may be rendered in any browser for which the web page resource is compatible, and is independent of the operating system of the user device.

Many publishers 104 provide the same content in both web resources and native applications. The management of the delivery of such content is handled by a publisher backend 120. The publisher backend 120 includes a publisher store 122 that stores content the publisher provides, a web server 124 that provides the content from the publisher store as web resources (e.g., web pages), and a native application server 126 that handles requests from a native application. The web pages correspond to native application pages, and thus for many native application URIs there are corresponding web page URIs. The content of the publisher store 122 is accessible for presentation on both the web resources and the corresponding native application pages. Accordingly, such content is referred to as "synchronized" content.

Examples of such publishers are news publishers, which may have a "mobile news app" for reading news content on a mobile device. The news content (e.g., the text of news story) provided on web resources 105 are the same content that is provided by the corresponding application pages of the native application 107.

A user device 108 is an electronic device that is capable of requesting and receiving web page resources 105 and native applications 107 over the network 102. Example user devices 108 include personal computers, mobile communication devices, and tablet computers.

The web index 112 is an index of publisher content that has, for example, been built from crawling the publisher web sites 104, by receiving data feeds from the publisher websites 104, or by other appropriate methods of collecting and indexing data.

The native application index 114 stores data relating to native applications 107. The application index 114 stores, for example, a list of native applications provided by the publishers 104 and identifiers that identify the native applications. Furthermore, in some implementations, publishers 104 may specify that certain native applications 107 are used to access and display synchronized data, and this information may be stored in the application index. For example, a news publisher may specify that a news reading application it provides displays synchronized content that is displayed on the news publisher's website. Data specifying this relationship may be, for example, a tuple pairs that pair various native application pages with corresponding web pages by the corresponding URI pairs.

The publisher may, in some implementations, specify what data the native application requires to access content provided on a web resource. For example, the publisher may specify that only the URL of a web resource is required by the native application to access and display the content displayed in the web resource. The application index 114 may also store additional information, depending on the implementation, and as described in more detail below.

The user devices 108 submit search queries to the search engine 110. In response to each query, the search engine 110 accesses the web index 112 and the application index 114 to identify content that is relevant to the query. The search engine 110 may, for example, identify the resources and applications in the form of web resource search results and native application search results, respectively, by use of a search result generator 116. Once generated, the search results are provided to the user device 108 from which the query was received.

A web resource search result is data generated by the search engine 110 that identifies a web resource, based on the content of the resource, that satisfies a particular search query. A web resource search result for a resource can include a web page title, a snippet of text extracted from the resource, and a uniform resource identifier (URI) for the resource, e.g., the uniform resource locator (URL) of the web page. When selected at a user device, the web resource search result causes the user device to generate a request for the resource located at the URL. The web resource that is received is then displayed in a browser application.

A native application search result specifies a native application and is generated in response to a search of the application index 114 and the web index 112, as described in more detail below. When selected at a user device, the native application search result causes the native application installed on the user device to request the synchronized content. Once the native application receives the requested content, the native application displays the content in a user interface of the native application.

Figure 2:
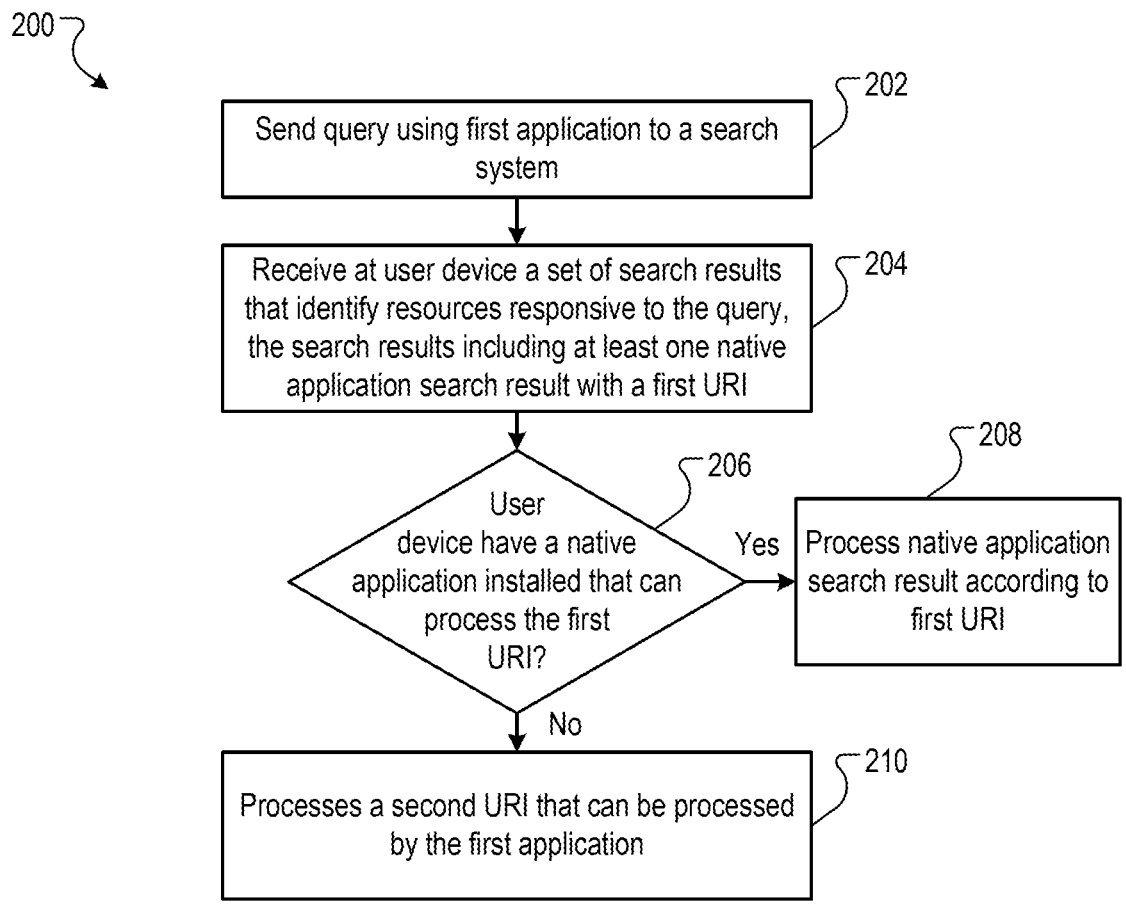
FIG. 2 is a flow diagram of an example process for processing a native application search result according to the installation status of a native application on a user device.

As described above, a particular user device may not have a particular native application installed, but may nevertheless receive a native application search result with a URI for that native application. Processing of such a native application search result is described with reference to FIG. 2. The process 200 can be implemented in a user device.

The process 200 sends query using first application to a search system (202). The search query includes one or more terms.

The process 200 receives data identifying resources responsive to the query (204). The data may include web search results and also include at least one native application search result. The native application search result identifies a native application and a first uniform resource identifier (URI) that, when processed by the native application, causes the native application to display a native application page that includes first content responsive to the query. The native application is an application that is different from the first application, the latter of which may be, for example a web browser. For example, the search result generator 116 receives data identifying resources that are determined to be responsive to the query, and generates the search results, which are then transmitted to the user device 108. The user device 108, in turn, receives the results.

The process 200 determines whether the user device has a native application installed that can process the first URI (206). For example, the native application search result may include a native application identifier, and a script running in the web browser may access a manifest of the user device to determine if the native application is installed. Other ways of determining whether a native application is installed can also be used.

If the process 200 determines the user device has a native application installed that can process the first URI, then the native application search result is processed according to the first URI. For example, the search result will be displayed with the first URI being operable to generate a request should the search result be selected.

If the process 200 determines the user device does not have an application installed that can process the first URI, then the process 200 processes a second URI that can be processed by the first application (210). The second URI, when processed, causes the first application to display a first application page that includes the first content responsive to the query. For example, the second URI that can be processed by the first application by rewriting the first URI with the second URI. The second URI may have been included with the native application search result but not in the form of an active link; however, when processed, the second URI mark-up code is modified to make the second URI active. Likewise, the first URI may be removed or its mark-up code altered to make it inactive.

Alternatively, if the second URI is not included with the native application, the user device may provide a request for the second URI to the search system 110, which then provides the second URI for processing.

In the native application search result, the URI may be visible, or may be embedded and associated with anchor text. In the case of the latter, the change in the URI is not visible to the user, thus resulting in a fluid experience.

As described above, the process 200 is performed when the search results are rendered. In an alternate implementation, the process 200 is performed in response to a native application search result being selected.

Figure 3A:
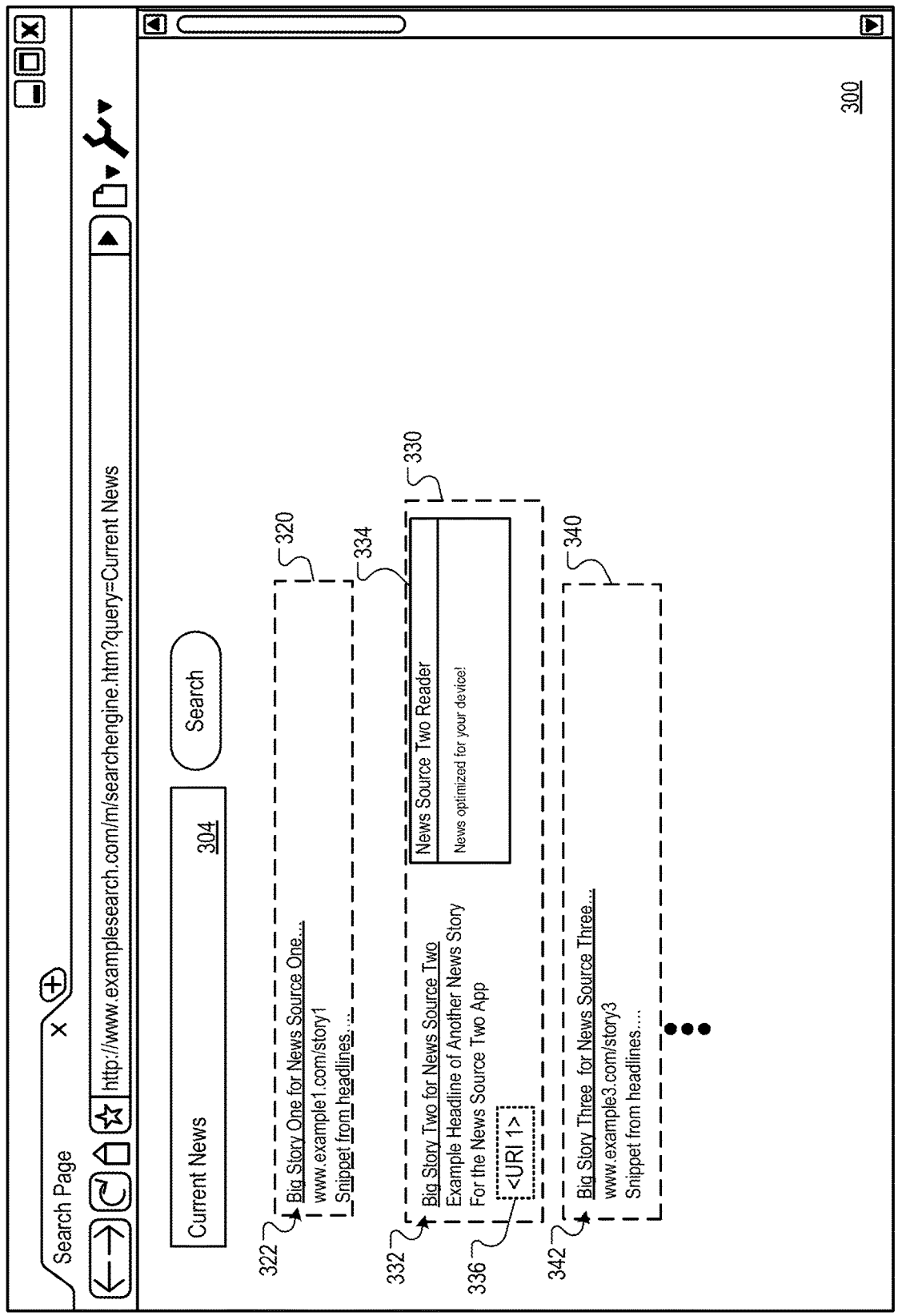
FIGS. 3A and 3B are illustrations of a search results page that includes a native application search result.

An example of a change in the URI's is described with reference to FIGS. 3A and 3B. FIG. 3A is an illustration of a search results page 300 that includes a native application search result. Displayed in the search results page 300 are search results 320, 330, and 340 that are responsive to the query "current news" displayed in the search input field 304. The search results 320 and 340 are web search results generated in response to a search of a web index 112 of resources. Each search result 320 and 340 references a resource that can be rendered in a browser application on a user device and includes a URL link to the resource, and other data 322 and 342, such as a snippet of text extracted for the referenced resource.

The search result 330 is a native application search result, and includes a first URI 1 336. The native application search result 330 may also include, for example, a snippet 332 of text and an image 334 of the native application display. The snippet 332 may be extracted from the web resource. In this example, the snippet 332 is a headline and text of a news story. The image 334 may be, for example, an image of a user interface of the native application. The image 334 helps visually distinguish the native application search result 330 from the web resource search results.

The first URI 336, when processed by a native application to which it corresponds, allows the user device to fetch synchronized content of a news server. The first URI 336 is shown in phantom, indicting it may be visible or embedded with anchor text.

If the native application is installed on the user device, the search result 330 is not altered. Selection of the image 334 or any other portion of the native application search result 332, at the user device will then causes the native application to launch and request the content that is relevant to the search query.

Figure 3B:
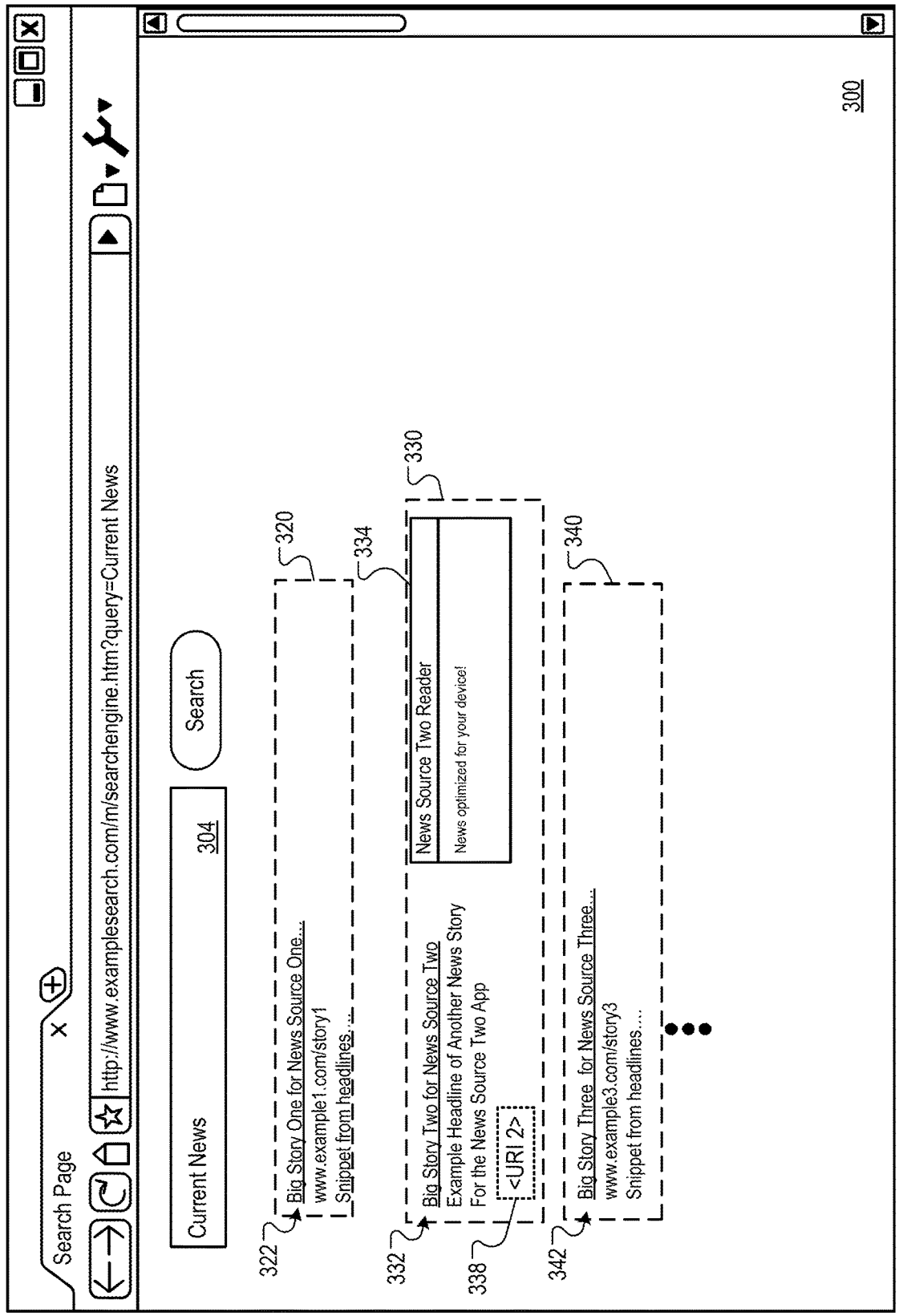

If, however, the process 200 detects the native application is not installed, the URI 336 is rewritten with the second URI 338, as shown in FIG. 3B. In this case, the search result 330 now links to a web resource at which the synchronized content is available.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving, at a user device in response to a query in a first application, a set of search results that identify resources responsive to the query, the search results including a native application search result that identifies a native application and a first uniform resource identifier (URI) that, when processed by the native application, causes the native application to display a native application page that includes first content responsive to the query, wherein the native application operates independent of a browser application and is an application that is different from the first application, wherein the native application search result is a search result that corresponds to a particular native application and that, when selected, invokes the particular native application, wherein the set of search results includes a second URI that can be processed by the first application and that causes the first application to display a first application page that includes the first content responsive to the query;
   determining, at the user device, whether the user device has a native application installed that can process the first URI of the native application search result; and
   in response to determining that the user device does not have a native application installed that can process the first URI, processing, at the user device, the second URI that can be processed by the first application, the processing comprising:
      rewriting the first URI in the native application search result with the second URI as an underlying link so that the native application search result remains unchanged from a user's perspective and, as a result of the rewriting, the selection of the native application search result causes the first application to display the first application page that includes the first content responsive to the query;
   wherein the content included in the first application page and the content included in the native application page are synchronized content.

2. The computer-implemented method of claim 1, wherein:
   determining whether the user device has a native application installed that can process the first URI of the native application search result comprises determining whether the user device has the native application installed in response to receiving the set of search results.

3. The computer-implemented method of claim 1, wherein:
   determining whether the user device has a native application installed that can process the first URI of the native application search result comprises determining whether the user device has the native application installed in response to a selection of the native application search result by a user.

4. The computer implemented method of claim 1, wherein determining whether the user device has a native application installed that can process the first URI of the native application search result comprises executing a script included with the set of search results.

5. The computer-implemented method of claim 1, further comprising, in response to determining that the user device has a native application installed that can process the first URI of the native application search result, launching the native application to process the first URI in response to a user selection of the native application search result.

6. The computer-implemented method of claim 1, wherein the first application is a web browser application and the second URI is a uniform resource locator (URL) of a web page.

7. A non-transitory computer readable storage medium storing instructions executable by a data processing apparatus and that upon such execution cause the data processing apparatus to perform operations comprising:
receiving, at a user device in response to a query in a first application, a set of search results that identify resources responsive to the query, the search results including a native application search result that identifies a native application and a first uniform resource identifier (URI) that, when processed by the native application, causes the native application to display a native application page that includes first content responsive to the query, wherein the native application operates independent of a browser application and is an application that is different from the first application, wherein the native application search result is a search result that corresponds to a particular native application and that, when selected, invokes the particular native application, wherein the set of search results includes a second URI that can be processed by the first application and that causes the first application to display a first application page that includes the first content responsive to the query;
determining, at the user device, whether the user device has a native application installed that can process the first URI of the native application search result; and
in response to determining that the user device does not have a native application installed that can process the first URI, processing, at the user device, the second URI that can be processed by the first application, the processing comprising:
rewriting the first URI in the native application search result with the second URI as an underlying link so that the native application search result remains unchanged from a user's perspective and, as a result of the rewriting, the selection of the native application search result causes the first application to display the first application page that includes the first content responsive to the query;
wherein the content included in the first application page and the content included in the native application page are synchronized content.

8. The non-transitory computer readable storage medium of claim 7, wherein:
determining whether the user device has a native application installed that can process the first URI of the native application search result comprises determining whether the user device has the native application installed in response to receiving the set of search results.

9. The non-transitory computer readable storage medium of claim 7, wherein:
determining whether the user device has a native application installed that can process the first URI of the native application search result comprises determining whether the user device has the native application installed in response to a selection of the native application search result by a user.

10. The non-transitory computer readable storage medium of claim 7, wherein determining whether the user device has a native application installed that can process the first URI of the native application search result comprises executing a script included with the set of search results.

11. The non-transitory computer readable storage medium of claim 7, further comprising, in response to determining that the user device has a native application installed that can process the first URI of the native application search result, launching the native application to process the first URI in response to a user selection of the native application search result.

12. The non-transitory computer readable storage medium of claim 7, wherein the first application is a web browser application and the second URI is a uniform resource locator (URL) of a web page.

13. A system, comprising:
receiving, at a user device in response to a query in a first application, a set of search results that identify resources responsive to the query, the search results including a native application search result that identifies a native application and a first uniform resource identifier (URI) that, when processed by the native application, causes the native application to display a native application page that includes first content responsive to the query, wherein the native application operates independent of a browser application and is an application that is different from the first application, wherein the native application search result is a search result that corresponds to a particular native application and that, when selected, invokes the particular native application, wherein the set of search results includes a second URI that can be processed by the first application and that causes the first application to display a first application page that includes the first content responsive to the query;
determining, at the user device, whether the user device has a native application installed that can process the first URI of the native application search result; and
in response to determining that the user device does not have a native application installed that can process the first URI, processing, at the user device, the second URI that can be processed by the first application, the processing comprising:
rewriting the first URI in the native application search result with the second URI as an underlying link so that the native application search result remains unchanged from a user's perspective and, as a result of the rewriting, the selection of the native application search result causes the first application to display the first application page that includes the first content responsive to the query;
wherein the content included in the first application page and the content included in the native application page are synchronized content.

14. The system of claim 13, wherein:
determining whether the user device has a native application installed that can process the first URI of the native application search result comprises determining whether the user device has the native application installed in response to receiving the set of search results.

15. The system of claim 13, wherein:
determining whether the user device has a native application installed that can process the first URI of the native application search result comprises determining whether the user device has the native application installed in response to a selection of the native application search result by a user.

16. The system of claim 13, wherein determining whether the user device has a native application installed that can process the first URI of the native application search result comprises executing a script included with the set of search results.

17. The system of claim 13, further comprising, in response to determining that the user device has a native application installed that can process the first URI of the native application search result, launching the native application to process the first URI in response to a user selection of the native application search result.

18. The system of claim 13, wherein the first application is a web browser application and the second URI is a uniform resource locator (URL) of a web page.

* * * * *